United States Patent
Yeh

(10) Patent No.: US 10,126,894 B2
(45) Date of Patent: Nov. 13, 2018

(54) POSITION DETECTION DEVICE

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 70 days.

(21) Appl. No.: 15/148,132

(22) Filed: May 6, 2016

(65) Prior Publication Data

US 2016/0328052 A1 Nov. 10, 2016

Related U.S. Application Data

(60) Provisional application No. 62/158,675, filed on May 8, 2015.

(30) Foreign Application Priority Data

Dec. 31, 2015 (TW) .............................. 104144647 A

(51) Int. Cl.
*G06F 3/044* (2006.01)
*G06F 3/041* (2006.01)
*A63D 15/20* (2006.01)
*A63F 7/02* (2006.01)
*A63F 7/06* (2006.01)
*A63F 9/24* (2006.01)

(52) U.S. Cl.
CPC ............. *G06F 3/044* (2013.01); *A63D 15/20* (2013.01); *G06F 3/0416* (2013.01); *A63F 7/022* (2013.01); *A63F 7/0632* (2013.01); *A63F 2009/2447* (2013.01); *G06F 2203/04107* (2013.01)

(58) Field of Classification Search
None
See application file for complete search history.

(56) References Cited

U.S. PATENT DOCUMENTS

| 2008/0132332 | A1* | 6/2008 | Pryor ..................... A63F 13/00 463/31 |
| 2010/0292945 | A1* | 11/2010 | Reynolds ................ G06F 3/044 702/65 |
| 2015/0317007 | A1* | 11/2015 | Yanagawa ............. G06F 1/1652 463/37 |

\* cited by examiner

*Primary Examiner* — Nicholas Lee
(74) *Attorney, Agent, or Firm* — WPAT, PC

(57) ABSTRACT

The present invention discloses a position detection device including a first electrode layer, a second electrode layer, and a processor. The first electrode layer includes a plurality of first electrodes, and the second electrode layer includes a plurality of second electrodes. A gap is formed between the first electrode layer and the second electrode layer. The processor detects a plurality of capacitive values between the plurality of first electrodes and the plurality of second electrodes so as to measure the movement track of a conductive object passing through the gap.

16 Claims, 11 Drawing Sheets

POSITION DETECTION DEVICE

CROSS REFERENCE TO RELATED APPLICATIONS

This application claims the benefit of U.S. Provisional Application No. 62/158,675, filed on May 8, 2015, and the benefit of Taiwan Application Serial No. 104144647, filed on Dec. 31, 2015, which are herein incorporated by reference for all intents and purposes.

BACKGROUND OF THE INVENTION

1. Field of the Invention

The present invention relates to a position detection device, and more particularly, to a position detection device detecting a conductive object therein.

2. Description of the Prior Art

Touch sensing panel has widely been applied to a lot of electronic devices. In general practice, a touch sensing panel placed on a touch display is defined as a two-dimensional touch sensing area for getting sensing information by scanning the vertical axis and horizontal axis on the touch sensing panel so as to determine an external object, such as a finger, touching or approaching the touch sensing panel. For example, a capacitive touch sensitive display disclosed by U.S. Pat. No. 4,639,720.

Referring to FIG. 1, a traditional position detection device 100 includes a sensing device 120, and a driving/detecting unit 130. The sensing device 120 has a sensing layer, and may include a first sensing layer 120A, and a second sensing layer 120B. The first and second sensing layers respectively have multiple sensors 140, and wherein multiple first sensors 140A of the first sensing layer 120A overlap multiple second sensor 140B of the second sensing layer 120B. The multiple first and second sensors 140A and 140B may be configured in the coplanar sensing layer. The driving/detecting unit 130 produces a sensing information according to the signals of the multiple sensors 140. For example, in self-capacitive detection, the signals are from sensing the driven sensors 140; and in mutual-capacitive detection, the signals are from sensing some sensors 140, which are not driven by the driving/detecting unit 130 directly. In addition, the sensing device 120 may be configured on a display 110, and a shielding layer (not shown) may be configured between the sensing device 120 and the display 110. Or, there is no the shielding layer between the sensing device 120 and the display 110.

However, the above-described position detection device 100 can only detect the external object(s), but cannot detect the conductive object(s) inside it. In other words, the traditional position detection device 100 only allows the conductive object(s) to move on its surface, but disallows the conductive object(s) to move in its inside.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In one embodiment, the present invention provides a position detection device, including: a first electrode layer including multiple first electrodes; a second electrode layer including multiple second electrodes, wherein a gap is formed between the first electrode layer and the second electrode layer; and a processor configured to detect multiple capacitive values between the multiple first electrodes and the multiple second electrodes so as to measure the movement track of at least one conductive object passing through the gap.

In one embodiment, the present invention provides a position detection device, including: a touch sensing panel; a third electrode layer configured to receiving a direct current signal, wherein a gap is formed between the touch sensing panel and the third electrode layer; and a processor configured to detect multiple capacitive values on the touch sensing panel so as to measure the movement track of at least one conductive object passing through the gap.

In one embodiment, the present invention provides a position detection device, including: a touch sensing panel; a processor configured to detect multiple capacitive values on the touch sensing panel so as to measure the movement track of at least one conductive object on one side of the touch sensing panel; and multiple blocking elements configured on the touch sensing panel to change the movement track of the at least one conductive object.

In one embodiment, the present invention provides a position detection device, including: a touch sensing panel including multiple holes for at least one conductive object to pass through; and a processor configured to detect multiple capacitive values on the touch sensing panel so as to measure the movement track of the at least one conductive object on one side of the touch sensing panel.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
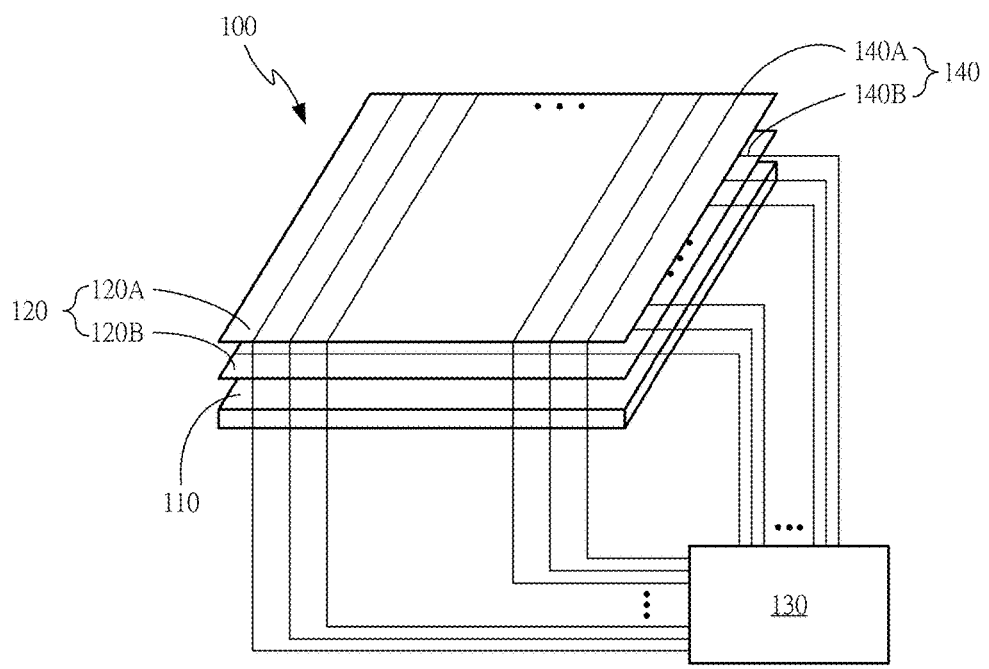
FIG. 1 depicts a touch sensing panel in the prior art.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

With the development of capacitive sensing technology, its applications are also increasingly prevalent. For example, the capacitive touch sensing panels using capacitive sensing technology are widely used in a variety of hand-held electronic devices and equipment as human-machine interfaces. The conventional arcade games, such as pachinko or pinball, may apply capacitive sensing technology for more game-changing so as to offer users a lot more fun.

Figure 2:
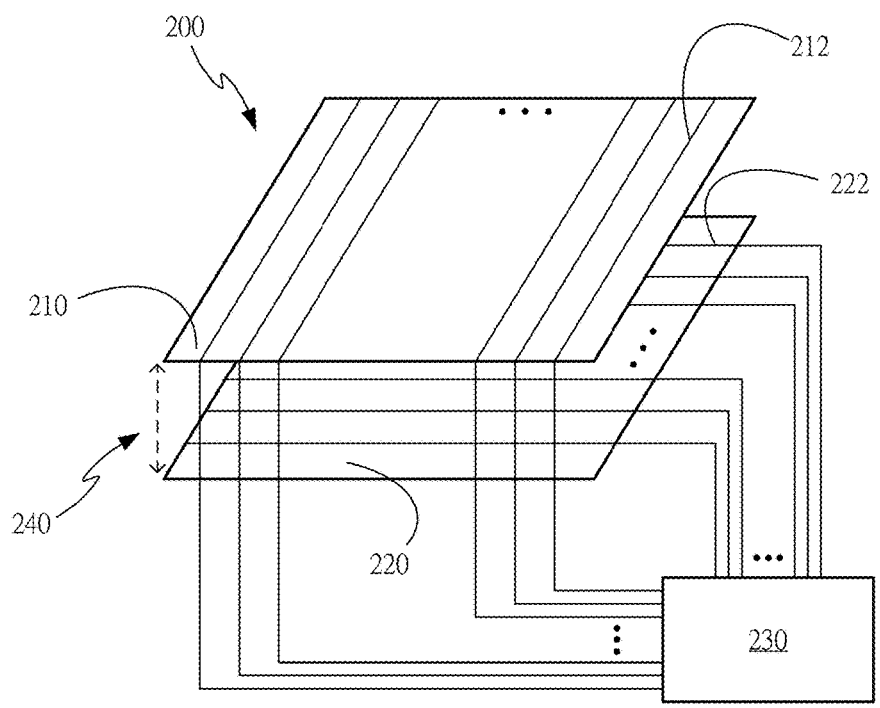
FIG. 2 depicts a position detection device according to an embodiment of the present invention.

Referring to FIG. 2, a position detection device 200 according to an embodiment of the present invention is illustrated. The position detection device 200 includes a first electrode layer 210, a second electrode layer 220, and a processor 230. The first electrode layer 210 includes multiple first electrodes 212, and the second electrode layer 220 includes multiple second electrodes 222, and wherein a gap 240 is formed between the first electrode layer 210 and the second electrode layer 220.

The multiple first electrodes 212 are parallel with each other to a first axis, and are electrically connected with the processor 230. Similarly, the multiple second electrodes 212 are parallel with each other to a second axis, and are electrically connected with the processor 230. The multiple first electrodes 212 intersect the multiple second electrodes 222 so as to form multiple sensing points, such as m*n sensing points, m and n are natural numbers. In some embodiments, the first axis may be perpendicular to the second axis, and m may be equal to n.

Taking a mutual-capacitive detection for an exemplary, the multiple first electrodes 212 sequentially or simultaneously receive a driving signal from the processor 230, and the processor 230 detects the multiple second electrodes 222 by mutual-capacitively detecting so as to get multiple capacitive signals corresponding to the multiple sensing points between the multiple first electrodes 212 and the multiple second electrodes 222. Also, the multiple second electrodes 222 sequentially or simultaneously receive a driving signal from the processor 230, and the processor 230 detects the multiple first electrodes 212 by mutual-capacitively detecting so as to get multiple capacitive signals corresponding to the multiple sensing points between the multiple first electrodes 212 and the multiple second electrodes 222.

Taking a self-capacitive detection for an exemplary, the multiple first electrodes 212 or the multiple second electrodes 222 sequentially or simultaneously receive a driving signal from the processor 230, and the processor 230 detects the driven first electrodes 212 or the driven second electrodes 222 by self-capacitively detecting.

The abovementioned capacitive signals may be the capacitive coupling amounts, the differences of capacitive coupling amounts, the dual-differences of capacitive coupling amounts, the capacitive coupling variations, the differences of capacitive coupling variations, or the dual-differences of capacitive coupling variations.

Figure 3A:
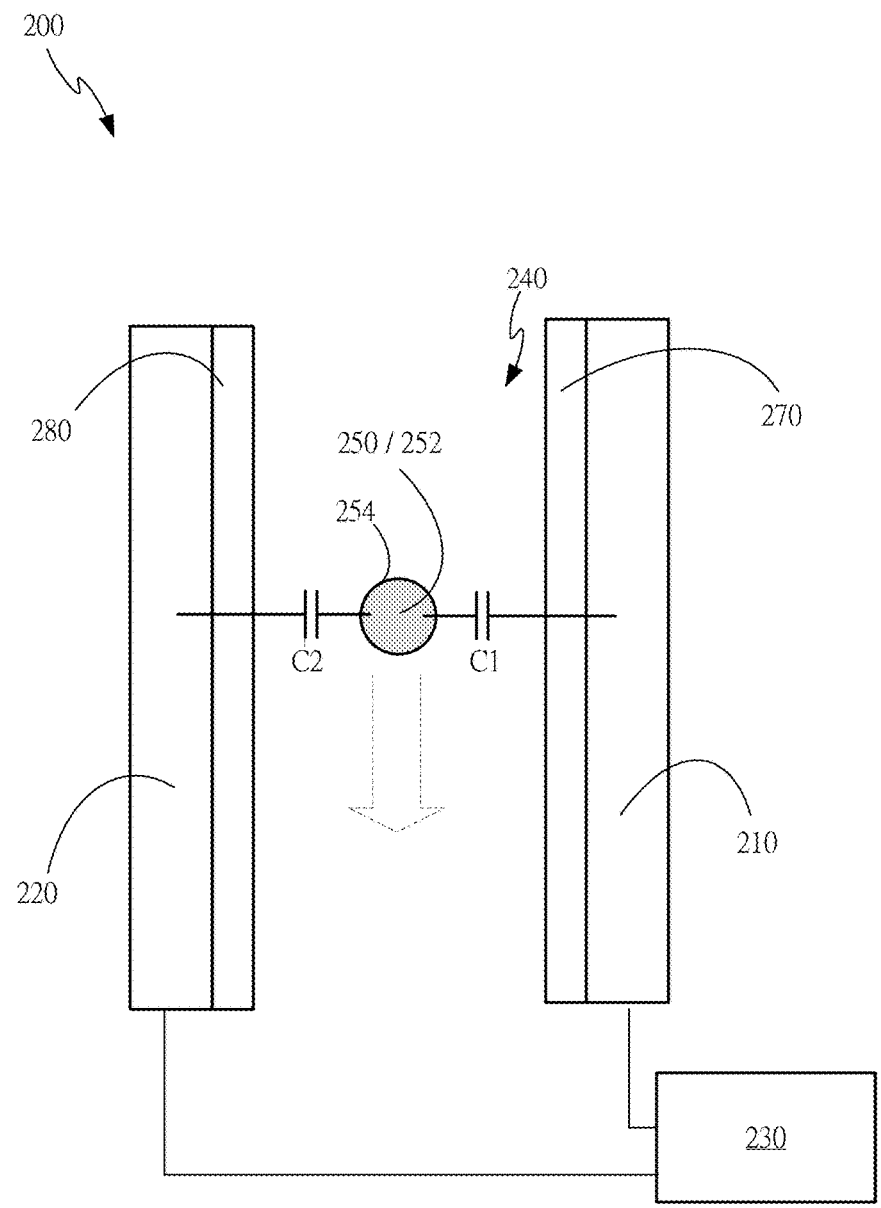
FIG. 3A depicts capacitive signals according to an embodiment of the present invention.
Figure 3B:
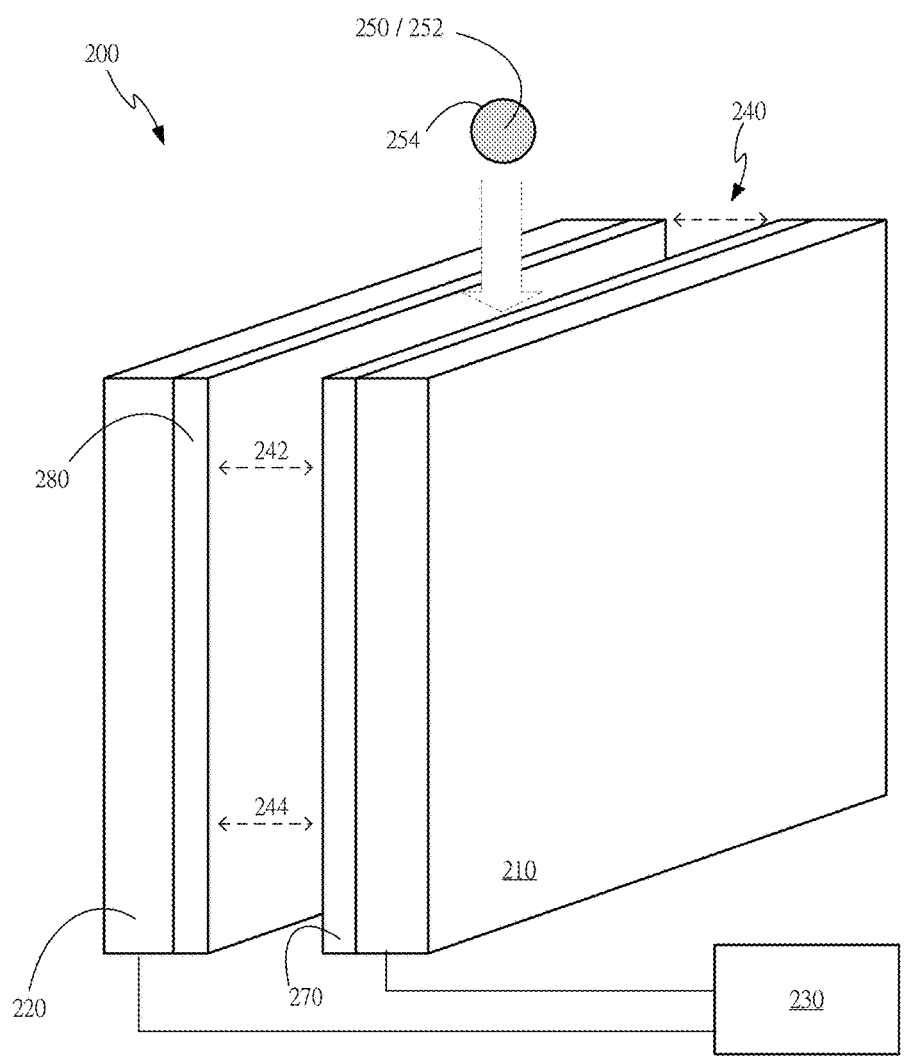
FIG. 3B depicts a position detection device according to an embodiment of the present invention.

Referring to FIGS. 3A and 3B, in actual operation, at least one conductive object 250 is put into the gap 240 from an inlet (not shown). A first capacitive coupling amount C1 is formed between the conductive object 250 and the first electrode layer 210, and a second capacitive coupling amount C2 is formed between the conductive object 250 and the second electrode layer 220. When the processor 230 performs self-capacitive detection or mutual-capacitive detection to the first electrode layer 210 and the second electrode layer 220, it can get the capacitive signals corresponding to multiple sensing points.

When the conductive object 250 passes through the gap 240, the processor 230 can detect the movement track of the conductive object 250 passing through the gap 240 according to the capacitive signals mentioned above. In the meanwhile, the first electrodes 212, which do not receive the driving signal, can receive a direct current (DC) signal in order to block the noise from outside.

In one embodiment of the present invention, the first electrode layer 210 or the second electrode layer 220 is not perpendicular to the direction of gravity. Hence, the conductive object 250 moves due to the force from gravity when it enters the gap 240 between the first electrode layer 210 and the second electrode layer 220.

In another embodiment of the present invention, the first electrode layer 210 or the second electrode layer 220 is perpendicular to the direction of gravity. Hence, the conductive object 250 is motionless due to gravity balance when it is in the gap 240 between the first electrode layer 210 and the second electrode layer 220. The conductive object 250 moves when an external force is exerted on it.

Figure 4:
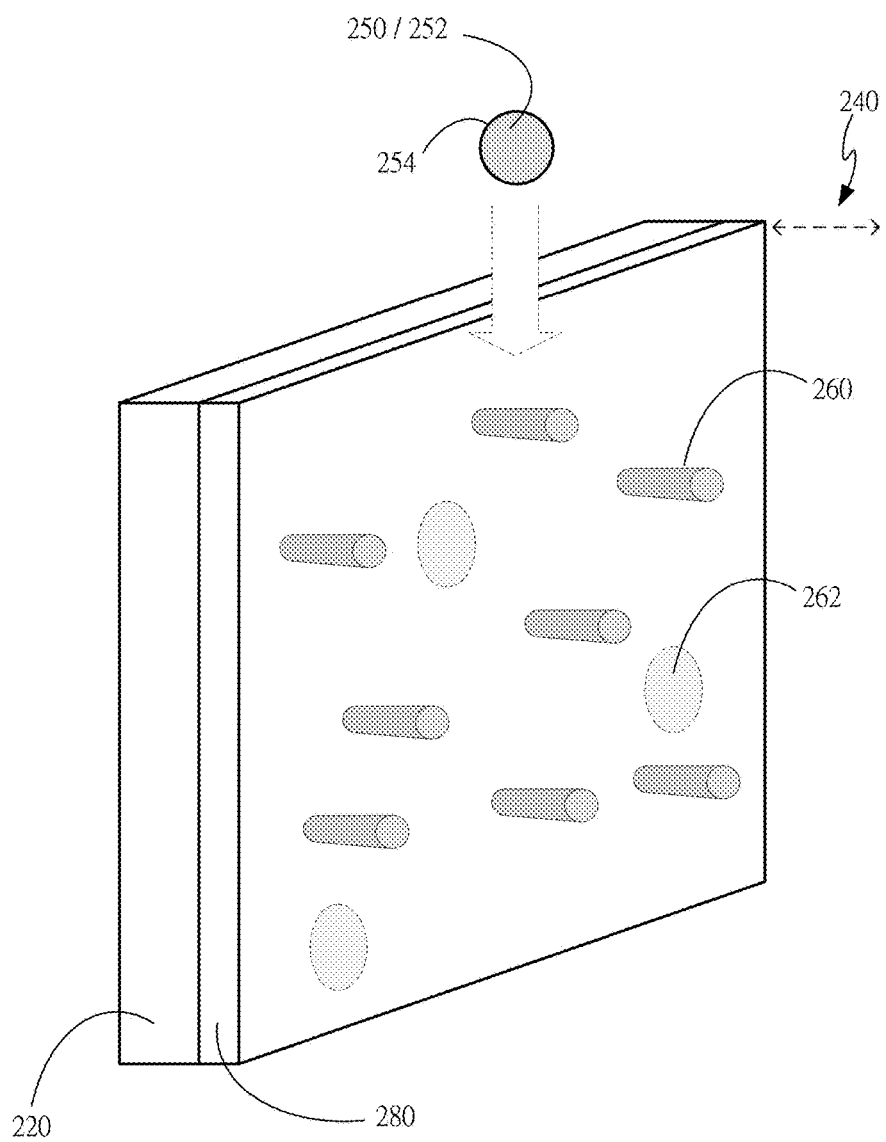
FIG. 4 depicts blocking elements and holes according to an embodiment of the present invention.

In some embodiments, the position detection device 200 may further include multiple blocking elements 260. As shown in FIG. 4, the multiple blocking elements may be in the shape of pillar. The multiple blocking elements 260 are configured in the gap 240 to change the movement track of the conductive object 250. For example, the multiple blocking elements 260 may be fixedly stuck on the first electrode layer 210 or the second electrode layer 220, or on both of the first electrode layer 210 and the second electrode layer 220 at the same time, so as to firm up the structure of the first electrode layer 210 and the second electrode layer 220.

In some embodiments, the position detection device 200 may further include multiple holes 262, as shown in FIG. 4. The multiple holes 262 are distributed over the first electrode layer 210 or the second electrode layer 220 for the conductive object 250 to pass through. Moreover, the multiple holes 262 may also be concurrently distributed over the first electrode layer 210 and the second electrode layer 220 so as to make the movement track of the conductive object 250 more changeable.

As shown in FIGS. 3A and 3B, the first electrode layer 210 and the second electrode layer 220 may be configured in parallel to each other. In the meantime, the width of the gap 240 is fixed. Therefore, in the gap 240, a first gap width of a first position 242 is the same as a second gap width of a second position 244.

Figure 5:
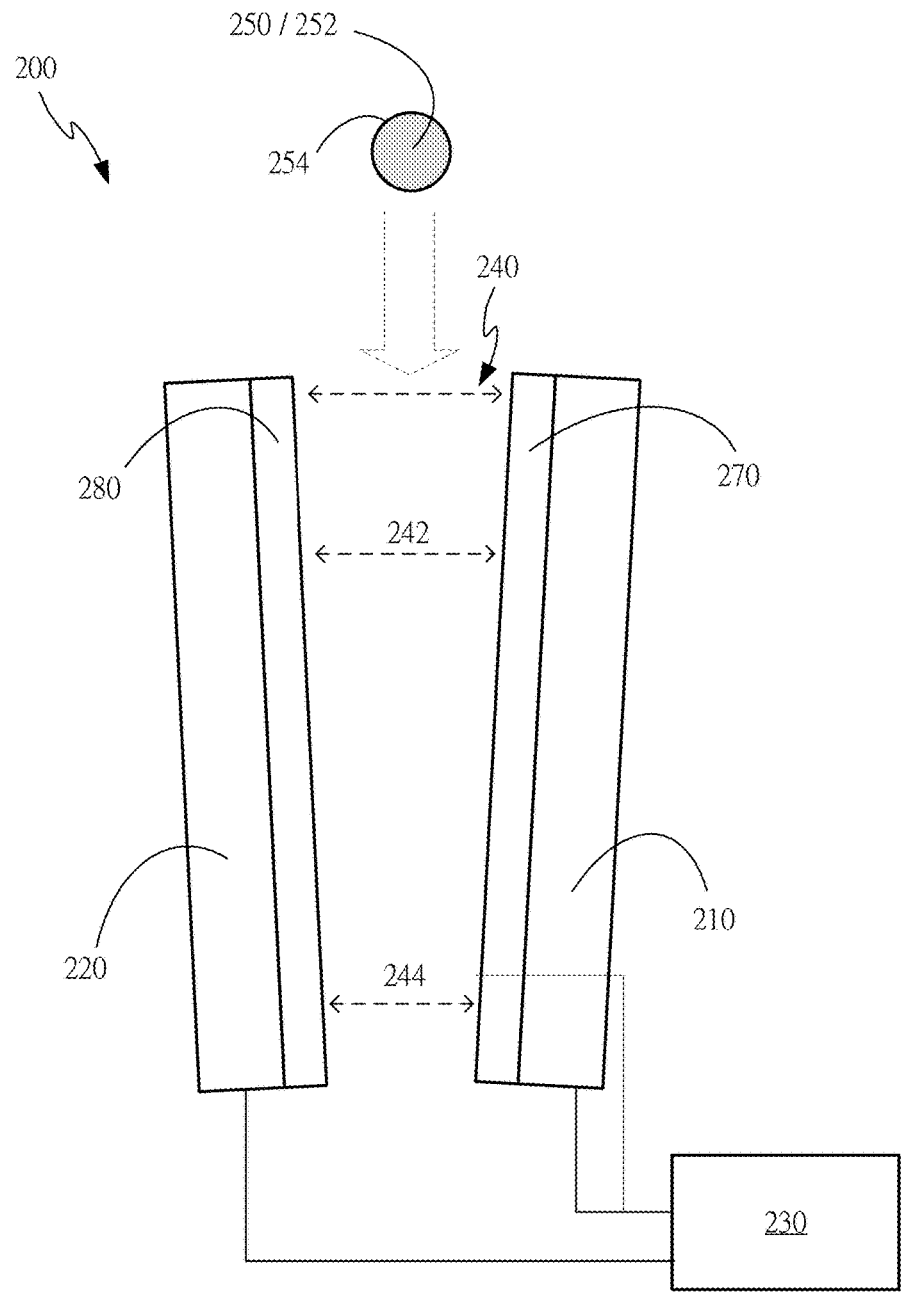
FIG. 5 depicts a position detection device according to an embodiment of the present invention.

Further, as shown in FIG. 5, the first electrode layer 210 and the second electrode layer 220 may be configured in non-parallel to each other. In the meantime, the width of the gap 240 is not fixed. Hence, in the gap 240, a first gap width of a first position 242 is not the same as a second gap width of a second position 244.

In order to produce the capacitive effect among the conductive object 250, the first electrode layer 210, and the second electrode layer 220, the conductive object 250 cannot directly touch the first electrode layer 210 and the second electrode layer 220. Thus, the position detection device 200 may further include a first insulation layer 270 and a second insulation layer 280, or the conductive object 250 may include a surface insulation layer 254.

When the position detection device 200 includes the first insulation layer 270 and the second insulation layer 280, the first insulation layer 270 is configured between the first electrode layer 210 and the gap 240, and the second insulation layer 280 is configured between the second electrode layer 220 and the gap 240. For example, the first insulation layer 270 is formed on the first electrode layer 210, the second insulation layer 280 is formed on the second electrode layer 220, and the gap 240 is between the first insulation layer 270 and the second insulation layer 280.

Or, when the position detection device 200 has no the first insulation layer 270 and the second insulation layer 280, the conductive object 250 covered totally by the surface insulation layer 254 is used to produce the capacitive effect among the conductive object 250, the first electrode layer 210, and the second electrode layer 220. In some embodiments, the position detection device 200 may include the first insulation layer 270 and the second insulation layer 280 with the conductive object 250 covered totally by the surface insulation layer 254 at the same time.

Referring to FIGS. 3A, 3B, and 4, since the position detection device 200 includes the first insulation layer 270 and the second insulation layer 280, the multiple blocking elements 260 may penetrate the first insulation layer 270 to stick on the first electrode layer 210, and penetrate the second insulation layer 280 to stick on the second electrode layer 220. Or, the multiple blocking elements 260 are directly stick on the first insulation layer 270 and the second insulation layer 280.

When the multiple holes 262 are distributed over the second electrode layer 220, they are also distributed over the second insulation layer 280. Also, when the multiple holes 262 are distributed over the first electrode layer 210, they are also distributed over the first insulation layer 270.

The position detection device 200 provided by the present invention could be applied to the arcade games, such as pachinko, pinball, table football, air hockey, touch hockey, or billiard table, etc.

Taking pachinko for an exemplary, the first electrode layer 210 is configured to be closer user side. For example, the first electrode layer 210 may be configured to be the surface glass of the pachinko machine. Since the first electrodes 212 on the first electrode layer 210, which do not receive the driving signal, can receive a direct current (DC) signal, the first electrodes 212 receiving the DC signal can be used to block the noise from the outside of the pachinko machine. The second electrode layer 220 is configured to be away from user side, that is, the second electrode layer 220 is configured inside the pachinko machine.

As shown in FIGS. 3A, 3B, and 4, the conductive object 250 may include at least one metal ball 252. The second electrode layer 220 and the gravity direction have an included angle of zero degree or zero in essence. When the metal ball 252 enters the gap 240 between the first electrode layer 210 and the second electrode layer 220, it falls down due to gravity.

In some embodiments, the multiple blocking elements 260 are configured in the gap 240 to change the movement track of the metal ball 252. The multiple holes 262 are configured on the first electrode layer 210 or the second electrode layer 220 for the metal ball 252 to pass through. The multiple holes 262 may further be concurrently configured on the first electrode layer 210 and the second electrode layer 220 to make the movement track of the metal ball 252 more changeable for increasing the game's complexity.

As shown in FIGS. 3A and 3B, the first electrode layer 210 and the second electrode layer 220 may be configured in parallel to each other. As shown in FIG. 5, the first electrode layer 210 and the second electrode layer 220 may be configured in non-parallel to each other.

In order to produce the capacitive effect among the metal ball 252, the first electrode layer 210, and the second electrode layer 220, the metal ball 252 cannot directly touch the first electrode layer 210 and the second electrode layer 220. Thus, the position detection device 200 may further include a first insulation layer 270 and a second insulation layer 280, or the metal ball 252 may include a surface insulation layer 254.

Further, taking pinball (not shown) for an exemplary, the first electrode layer 210 is configured to be closer user side. For example, the first electrode layer 210 may be configured to be the surface glass of the pinball machine. The second electrode layer 220 is configured to be away from user side, that is, the second electrode layer 220 is configured inside the pinball machine. The conductive object 250 may include at least one metal ball 252. The second electrode layer 220 is almost perpendicular to the gravity direction, but not totally vertically. When the metal ball 252 enters the gap 240, it rolls and moves on the second electrode layer 220 due to gravity.

In addition, taking table football, air hockey, touch hockey, or billiard table (not shown) for examples, the first electrode layer 210 is configured to be closer user side. For example, the first electrode layer 210 may be configured to be the surface glass of the table football, air hockey, touch hockey, or billiard table machine. The second electrode layer 220 is configured to be away from user side, that is, the second electrode layer 220 is configured inside the table football, air hockey, touch hockey, or billiard table machine. The second electrode layer 220 is perpendicular to the direction of gravity. Hence, the conductive object 250 is motionless due to gravity balance when it is in the gap 240. The conductive object 250 moves when an external force is exerted on it.

Taking table football or billiard table for example, the conductive object 250 may include at least one metal ball 252. As for air hockey or touch hockey in the present invention, the conductive object 250 may include at least one metal puck.

Figure 6:
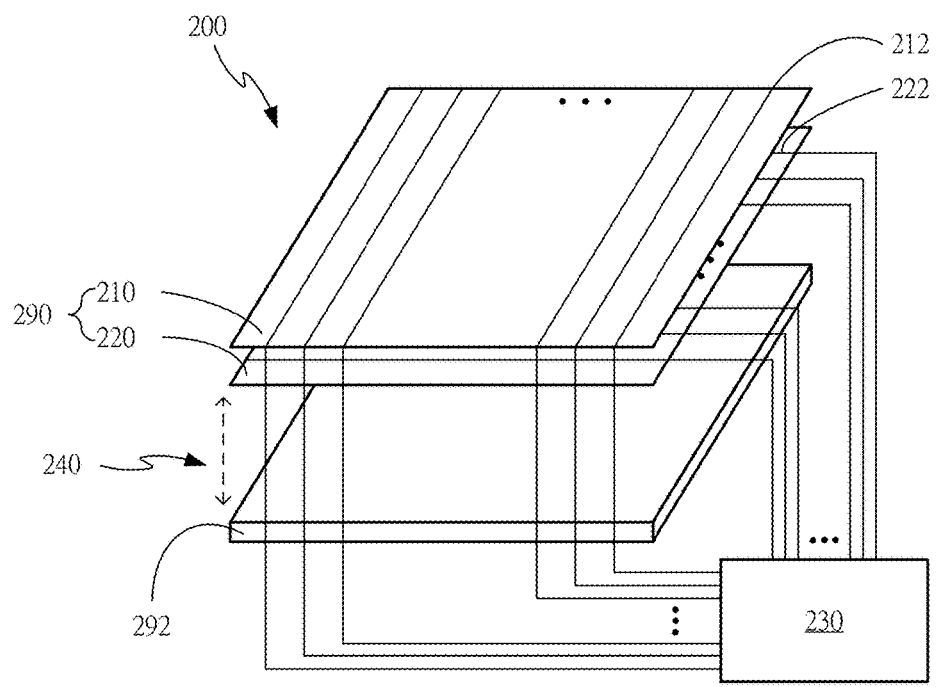
FIG. 6 depicts a position detection device according to an embodiment of the present invention.

Referring to FIG. 6, a position detection device 200 according to an embodiment of the present invention is illustrated. The position detection device 200 includes a touch sensing panel 290, a third electrode layer 292, and a processor 230. The touch sensing panel 290 includes the above-described first electrode layer 210 and second electrode layer 220. The first electrode layer 210 includes multiple first electrodes 212, and the second electrode layer 220 includes multiple second electrodes 222. The third electrode layer 292 receives a DC signal so as to block an external noise. In some embodiments, the first electrode layer 210 and the second electrode layer 220 may further be formed single conductive film structure, such as single indium tin oxide (SITO) structure.

The multiple first electrodes 212 are parallel with each other to a first axis, and are electrically connected with the processor 230. Similarly, the multiple second electrodes 222 are parallel with each other to a second axis, and are electrically connected with the processor 230. The multiple first electrodes 212 intersect the multiple second electrodes 222 so as to form multiple sensing points, such as m*n sensing points, m and n are natural numbers. In some embodiments, the first axis may be perpendicular to the second axis, and m may be equal to n.

Taking a mutual-capacitive detection for an exemplary, the multiple first electrodes 212 sequentially or simultaneously receive a driving signal from the processor 230, and the processor 230 detects the multiple second electrodes 222 by mutual-capacitively detecting so as to get multiple capacitive signals corresponding to the multiple sensing points between the multiple first electrodes 212 and the multiple second electrodes 222. Also, the multiple second electrodes 222 sequentially or simultaneously receive a driving signal from the processor 230, and the processor 230 detects the multiple first electrodes 212 by mutual-capacitively detecting so as to get multiple capacitive signals corresponding to the multiple sensing points between the multiple first electrodes 212 and the multiple second electrodes 222.

Taking a self-capacitive detection for an exemplary, the multiple first electrodes 212 or the multiple second electrodes 222 sequentially or simultaneously receive a driving signal from the processor 230, and the processor 230 detects the driven first electrodes 212 or the driven second electrodes 222 by self-capacitively detecting.

Figure 7A:
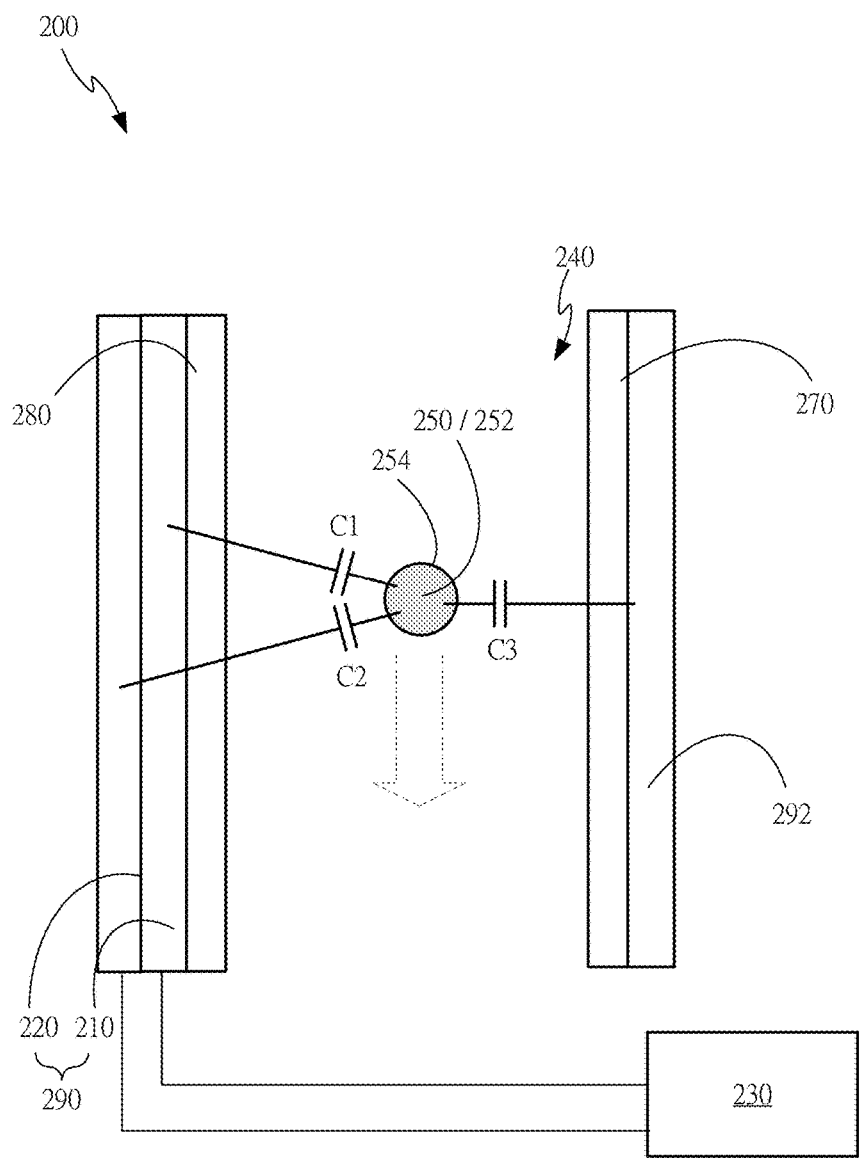
FIG. 7A depicts capacitive signals according to an embodiment of the present invention.
Figure 7B:
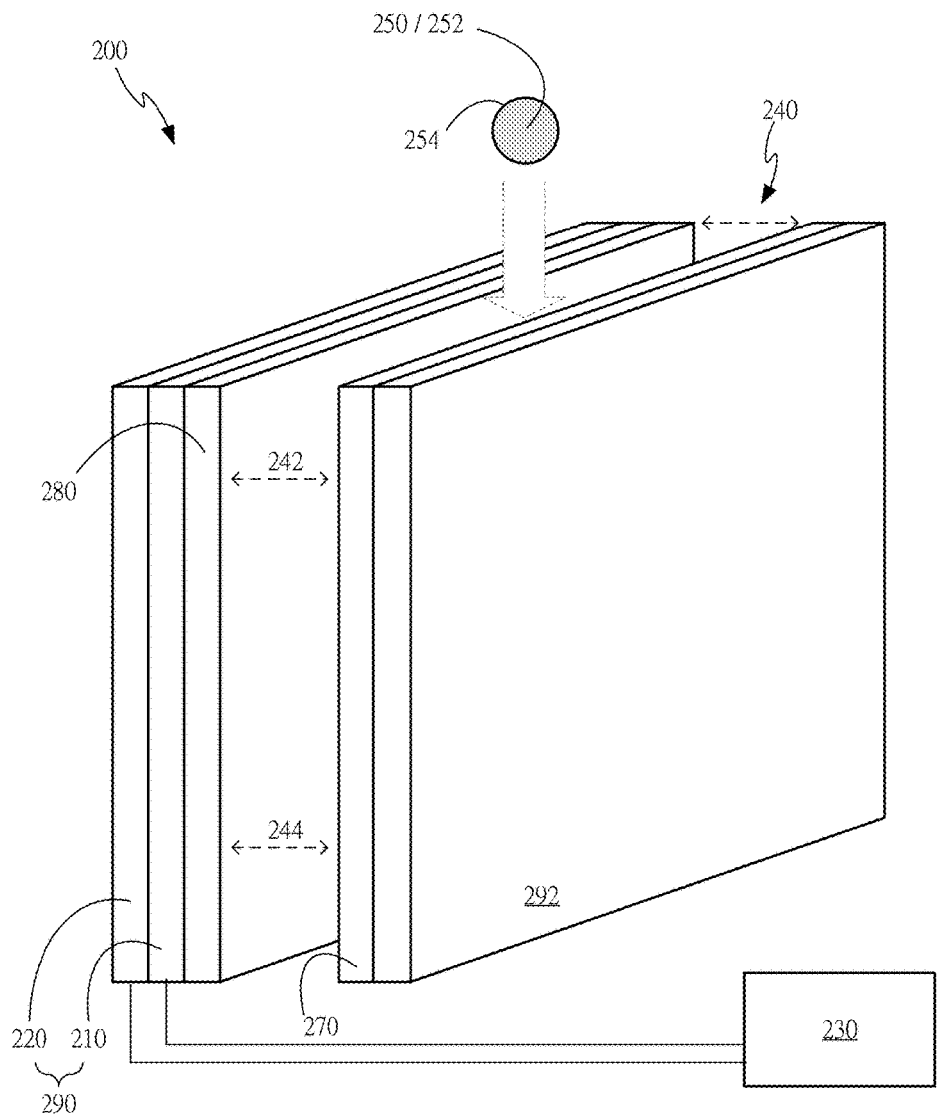
FIG. 7B depicts a position detection device according to an embodiment of the present invention.

Referring to FIGS. 7A and 7B, in actual operation, at least one conductive object 250 is put into the gap 240 from an inlet (not shown). A first capacitive coupling amount C1 is formed between the conductive object 250 and the first electrode layer 210, a second capacitive coupling amount C2 is formed between the conductive object 250 and the second electrode layer 220, and a third capacitive coupling amount C3 is formed between the conductive object 250 and the third electrode layer 292. When the processor 230 performs self-capacitive detection or mutual-capacitive detection to the first electrode layer 210 and the second electrode layer 220, it can get the capacitive signals in response to multiple sensing points.

When the conductive object 250 passes through the gap 240, the processor 230 can detect the movement track of the conductive object 250 passing through the gap 240 according to the capacitive signals mentioned above. In the meanwhile, the first electrodes 212, which do not receive the driving signal, can receive a direct current (DC) signal in order to block the noise from outside.

In one embodiment of the present invention, the touch sensing panel 290 or the third electrode layer 292 is not perpendicular to the direction of gravity. Hence, the conductive object 250 moves due to the force from gravity when it enters the gap 240 between the touch sensing panel 290 and the third electrode layer 292.

In another embodiment of the present invention, the touch sensing panel 290 or the third electrode layer 292 is perpendicular to the direction of gravity. Hence, the conductive object 250 is motionless due to gravity balance when it is in the gap 240 between the touch sensing panel 290 and the third electrode layer 292. The conductive object 250 moves when an external force is exerted on it.

Figure 8:
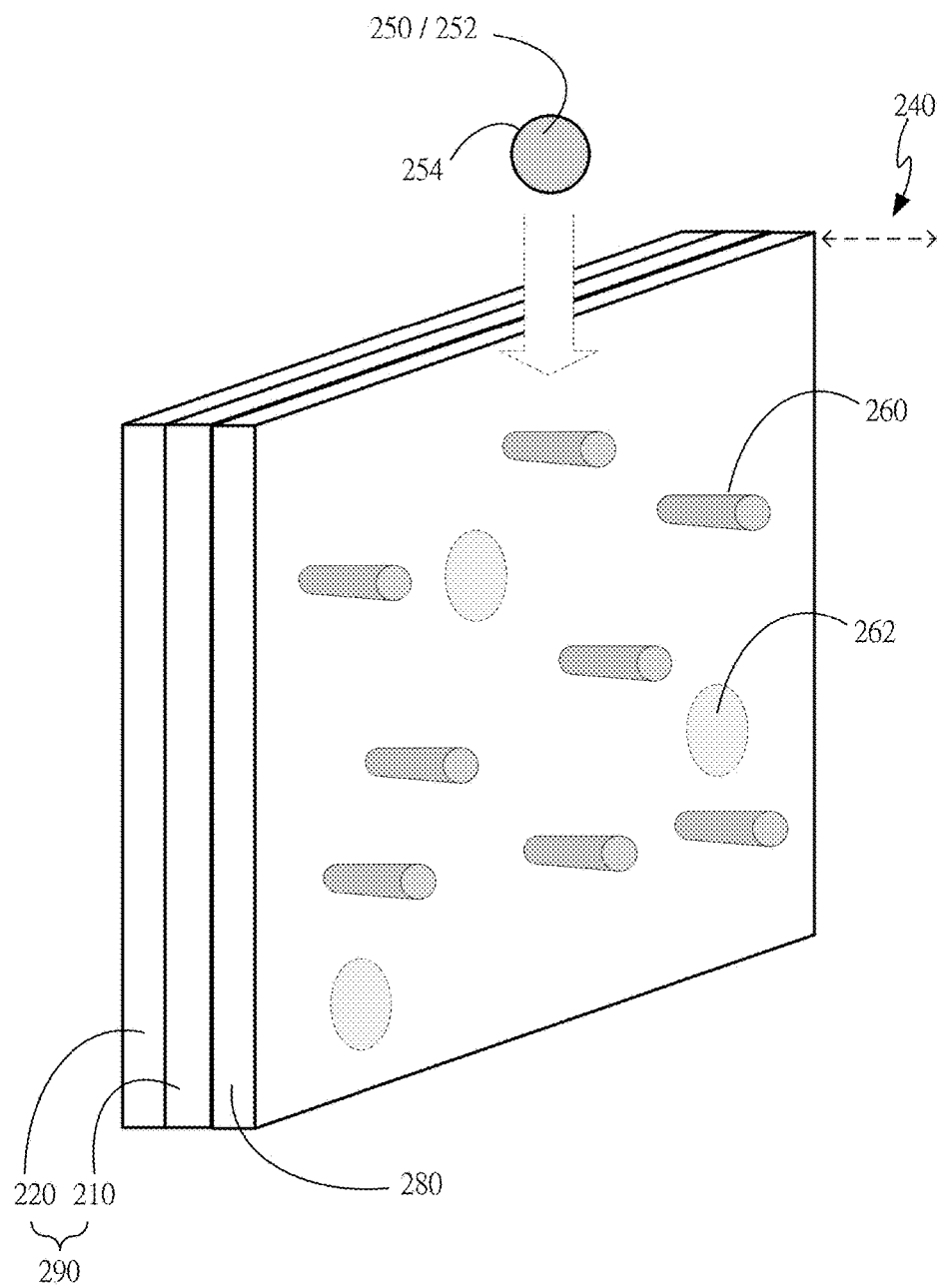
FIG. 8 depicts blocking elements and holes according to an embodiment of the present invention.

In some embodiments, the position detection device 200 may further include multiple blocking elements 260. As shown in FIG. 8, the multiple blocking elements 260 are configured in the gap 240 to change the movement track of the conductive object 250. For example, the multiple blocking elements 260 may be fixedly stuck on the touch sensing panel 290 or the third electrode layer 292, or on both of the touch sensing panel 290 and the third electrode layer 220 at the same time, so as to firm up the structure of the touch sensing panel 290 and the third electrode layer 292.

In some embodiments, the position detection device 200 may further include multiple holes 262. The multiple holes 262 are distributed over the touch sensing panel 290 for the conductive object 250 to pass through.

As shown in FIGS. 7A and 7B, the touch sensing panel 290 and the third electrode layer 292 may be configured in parallel to each other. In the meantime, the width of the gap 240 is fixed. Therefore, in the gap 240, a first gap width of a first position 242 is the same as a second gap width of a second position 244.

Figure 9:
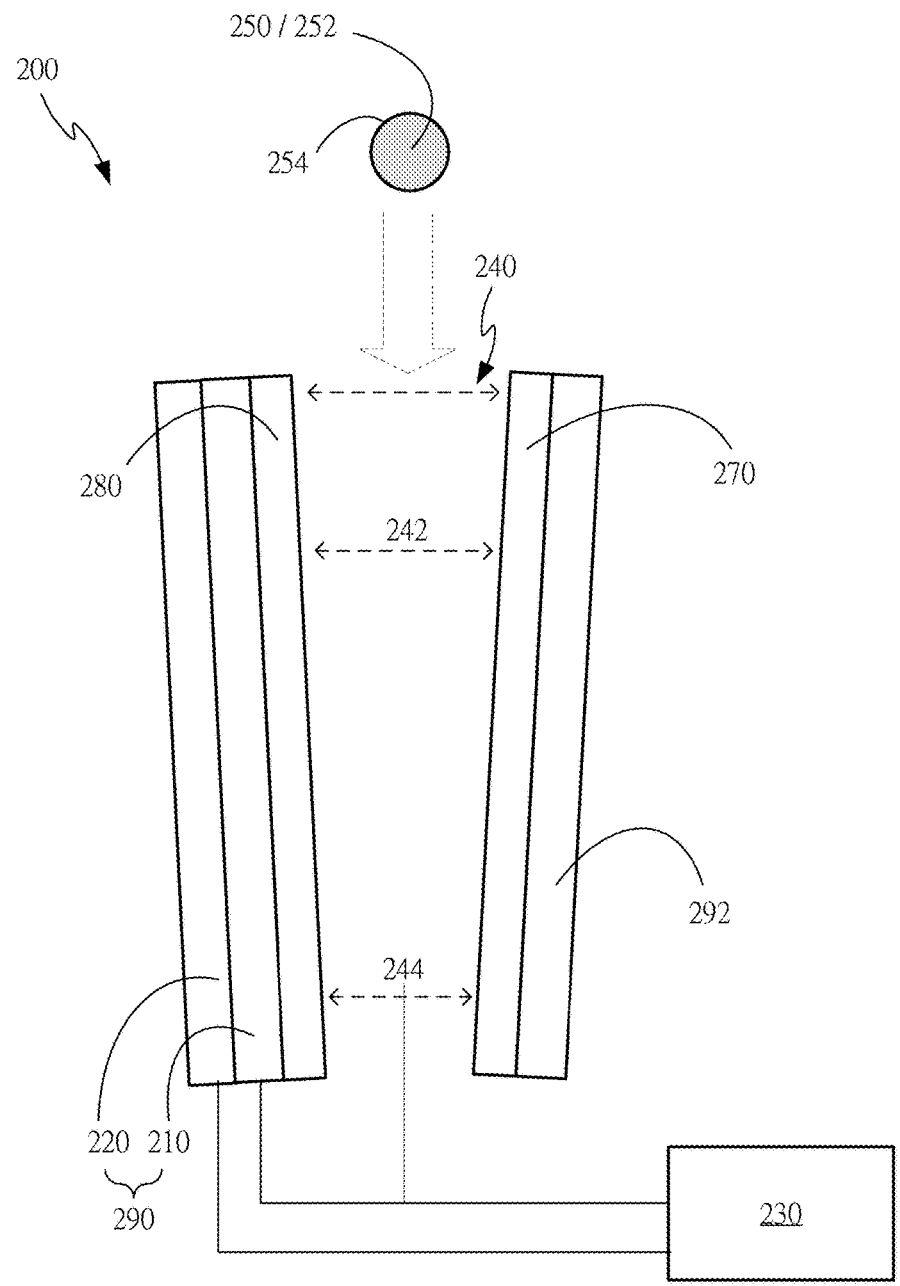
FIG. 9 depicts a position detection device according to an embodiment of the present invention.

Further, as shown in FIG. 9, the touch sensing panel 290 and the third electrode layer 292 may be configured in non-parallel to each other. In the meantime, the width of the gap 240 is not fixed. Hence, in the gap 240, a first gap width of a first position 242 is not the same as a second gap width of a second position 244.

In order to produce the capacitive effect among the conductive object 250, the touch sensing panel 290, and the third electrode layer 292, the conductive object 250 cannot directly touch the touch sensing panel 290 and the third electrode layer 292. Thus, the position detection device 200 may further include a first insulation layer 270 and a second insulation layer 280, or the conductive object 250 may include a surface insulation layer 254.

When the position detection device 200 includes the first insulation layer 270 and the second insulation layer 280, the first insulation layer 270 is configured between the third electrode layer 292 and the gap 240, and the second insulation layer 280 is configured between the touch sensing panel 290 and the gap 240. For example, the first insulation layer 270 is formed on the third electrode layer 292, the second insulation layer 280 is formed on the touch sensing panel 290, and the gap 240 is between the first insulation layer 270 and the second insulation layer 280.

Or, when the position detection device 200 has no the first insulation layer 270 and the second insulation layer 280, the conductive object 250 covered totally by the surface insulation layer 254 is used to produce the capacitive effect among the conductive object 250, the touch sensing panel 290, and the third electrode layer 292. In some embodiments, the position detection device 200 may include the first insulation layer 270 and the second insulation layer 280 with the conductive object 250 covered totally by the surface insulation layer 254 at the same time.

Referring to FIGS. 7A, 7B, and 8, since the position detection device 200 includes the first insulation layer 270 and the second insulation layer 280, the multiple blocking elements 260 may penetrate the first insulation layer 270 to stick on the third electrode layer 292, and penetrate the second insulation layer 280 to stick on the touch sensing panel 290. Or, the multiple blocking elements 260 are directly stick on the first insulation layer 270 and the second insulation layer 280.

When the multiple holes 262 are distributed over the touch sensing panel 290, they are also distributed over the second insulation layer 280.

Also, taking pachinko for an exemplary, the third electrode layer 292 is configured to be closer user side. For example, the third electrode layer 292 may be configured to be the surface glass of the pachinko machine. Since the third electrode layer 292 receives a DC signal, the third electrode layer 292 is configured to block the noise from the outside of the pachinko machine. The touch sensing panel 290 is configured to be away from user side, that is, the touch sensing panel 290 is configured inside the pachinko machine.

As shown in FIGS. 7A, 7B, and 8, the conductive object 250 may include at least one metal ball 252. The touch sensing panel 290 and the gravity direction have an included angle of zero degree or zero in essence. When the metal ball 252 enters the gap 240 between the touch sensing panel 290 and the third electrode layer 292, it falls down due to gravity.

In some embodiments, the multiple blocking elements 260 are configured in the gap 240 to change the movement track of the metal ball 252. The multiple holes 262 are configured on the touch sensing panel 290 for the metal ball 252 to pass through.

As shown in FIGS. 7A and 7B, the touch sensing panel 290 and the third electrode layer 292 may be configured in parallel to each other. As shown in FIG. 9, the touch sensing panel 290 and the third electrode layer 292 may be configured in non-parallel to each other.

In order to produce the capacitive effect among the metal ball 252, the touch sensing panel 290, and the third electrode layer 292, the metal ball 252 cannot directly touch the touch sensing panel 290 and the third electrode layer 292. Thus, the position detection device 200 may further include a first insulation layer 270 and a second insulation layer 280, or the metal ball 252 may include a surface insulation layer 254.

Further, taking pinball (not shown) for an exemplary, the third electrode layer 292 is configured to be closer user side. For example, the third electrode layer 292 may be configured to be the surface glass of the pinball machine. The touch sensing panel 290 is configured to be away from user side, that is, the touch sensing panel 290 is configured inside the pinball machine. The conductive object 250 may include at least one metal ball 252. The touch sensing panel 290 is almost perpendicular to the gravity direction, but not totally vertically. When the metal ball 252 enters the gap 240, it rolls and moves on the touch sensing panel 290 due to gravity.

In addition, taking table football, air hockey, touch hockey, or billiard table (not shown) for examples, the third electrode layer 292 is configured to be closer user side. For example, the third electrode layer 292 may be configured to be the surface glass of the table football, air hockey, touch hockey, or billiard table machine. The touch sensing panel 290 is configured to be away from user side, that is, the touch sensing panel 290 is configured inside the table football, air hockey, touch hockey, or billiard table machine. The touch sensing panel 290 is perpendicular to the direction of gravity. Hence, the conductive object 250 is motionless due to gravity balance when it is in the gap 240. The conductive object 250 moves when an external force is exerted on it.

Taking table football or billiard table for example, the conductive object 250 may include at least one metal ball 252. As for air hockey or touch hockey in the present invention, the conductive object 250 may include at least one metal puck.

In one embodiment, the present invention provides a position detection device, including: a touch sensing panel; a processor; and multiple blocking elements. The multiple blocking elements are configured on the touch sensing panel so as to change the movement track of at least one conductive object. The processor detects multiple capacitive signals of the touch sensing panel so as to get the movement track of the at least one conductive object on one side of the touch sensing panel.

In another embodiment, the present invention provides a position detection device, includes: a touch sensing panel; and a processor. The touch sensing panel includes multiple holes for at least one conductive object to pass through. The processor detects multiple capacitive signals of the touch sensing panel so as to get the movement track of the at least one conductive object on one side of the touch sensing panel.

The above-described first electrode layer, second electrode layer, third electrode layer, first insulation layer, and second insulation layer may include transparent material(s). The first electrodes and second electrodes may include transparent conductive material(s) and/or metallic material(s), and their electrode structures in shapes may include bar, rhombus, rectangle, circle, and etc.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:
1. A position detection device, comprising:
a first electrode layer, comprising a plurality of first electrodes;
a second electrode layer, comprising a plurality of second electrodes, wherein a gap is formed between the first electrode layer and the second electrode layer; and
a processor, configured to detect a plurality of capacitive values between the plurality of first electrodes and the plurality of second electrodes so as to measure the movement track of at least one conductive object passing through the gap.
2. The position detection device of claim 1, wherein the first electrode layer or the second electrode layer is not perpendicular to a direction of gravity, or the second electrode layer is perpendicular to the direction of gravity.
3. The position detection device of claim 1, further comprising:
a first insulation layer and a second insulation layer, the first insulation layer being between the first electrode layer and the gap, the second insulation layer being between the second electrode layer and the gap.
4. The position detection device of claim 1, wherein the at least one conductive object comprises a surface insulation layer to cover the at least one conductive object.
5. The position detection device of claim 1, further comprising:
a plurality of blocking elements configured in the gap so as to change the movement track of the at least one conductive object, wherein the plurality of blocking elements are fixedly stuck on the first electrode layer or the second electrode layer, or on both of the first electrode layer and the second electrode layer at the same time.
6. The position detection device of claim 1, wherein the plurality of first electrodes receive a driving signal in turn or simultaneously, the processor detects the plurality of second electrodes in mutual-capacitive mode or self-capacitive mode so as to detect the plurality of capacitive values, wherein some of the plurality of the first electrodes, which do not receive the driving signal, receive a direct current signal.
7. The position detection device of claim 1, wherein the first electrode layer or the second electrode layer comprises a plurality of holes for the at least one conductive object to pass through.
8. The position detection device of claim 1, wherein the first electrode layer and the second electrode layer are configured to be in parallel or non-parallel.
9. A position detection device, comprising:
a touch sensing panel;
a third electrode layer, configured to receive a direct current signal, wherein a gap is formed between the touch sensing panel and the third electrode layer; and a processor, configured to detect a plurality of capacitive values on the touch sensing panel so as to measure the movement track of at least one conductive object passing through the gap.

10. The position detection device of claim 9, wherein the touch sensing panel or the third electrode layer is not perpendicular to a direction of gravity, or the touch sensing panel is perpendicular to the direction of gravity.

11. The position detection device of claim 9, further comprising:
   a first insulation layer and a second insulation layer, the first insulation layer being between the third electrode layer and the gap, the second insulation layer being between the touch sensing panel and the gap.

12. The position detection device of claim 9, wherein the at least one conductive object comprises a surface insulation layer to cover the at least one conductive object.

13. The position detection device of claim 9, further comprising:
   a plurality of blocking elements configured in the gap so as to change the movement track of the at least one conductive object, wherein the plurality of blocking elements are fixedly stuck on the touch sensing panel or the third electrode layer, or on both of the touch sensing panel and the third electrode layer at the same time.

14. The position detection device of claim 9, wherein the touch sensing panel comprises a plurality of first electrodes and a plurality of second electrodes, when the plurality of first electrodes receive a driving signal in turn or simultaneously, the processor detects the plurality of second electrodes in mutual-capacitive mode or self-capacitive mode so as to detect the plurality of capacitive values, wherein some of the plurality of the first electrodes, which do not receive the driving signal, receive a direct current signal.

15. The position detection device of claim 9, wherein the touch sensing panel or the third electrode layer comprises a plurality of holes for the at least one conductive object to pass through.

16. The position detection device of claim 9, wherein the touch sensing panel and the third electrode layer are configured to be in parallel or non-parallel.

* * * * *